United States Patent
Oshima et al.

(10) Patent No.: US 11,414,620 B2
(45) Date of Patent: Aug. 16, 2022

(54) LUBRICANT COMPOSITION, SLIDING APPARATUS, FIXING APPARATUS, AND IMAGE-FORMING APPARATUS

(71) Applicant: CANON KABUSHIKI KAISHA, Tokyo (JP)

(72) Inventors: Yoshihito Oshima, Yokohama (JP); Yohei Miyauchi, Tokyo (JP); Yasuharu Notoya, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 103 days.

(21) Appl. No.: 16/984,284

(22) Filed: Aug. 4, 2020

(65) Prior Publication Data
US 2021/0054300 A1 Feb. 25, 2021

(30) Foreign Application Priority Data
Aug. 23, 2019 (JP) .............................. JP2019-153016

(51) Int. Cl.
*C10M 169/00* (2006.01)
*C10M 169/06* (2006.01)
(Continued)

(52) U.S. Cl.
CPC ........ *C10M 169/06* (2013.01); *C10M 107/38* (2013.01); *C10M 119/22* (2013.01);
(Continued)

(58) Field of Classification Search
CPC .............. C10M 169/06; C10M 107/38; C10M 119/22; C10M 147/04; C10M 2213/003; C10M 2213/006; C10M 2213/04; C10M 2213/062; C10M 2290/10; C10M 2209/04; C10M 2213/043; C10M 2213/06; C10M 2213/0626; C10M 169/00;
(Continued)

(56) References Cited

U.S. PATENT DOCUMENTS 5,159,019 A 10/1992 Yamamoto et al.
5,300,366 A 4/1994 Nakamaru et al.
(Continued)

FOREIGN PATENT DOCUMENTS

CN 101589077 A 11/2009
CN 101589088 A 11/2009
(Continued)

OTHER PUBLICATIONS

Gianni Golemme and Anna Santaniello: Perfluoropolymer/Molecular Sieve Mixed-Matrix Membranes; Membranes 2019, 9(2), 19; https://doi.org/10.3390/membranes9020019 Revised: Jan. 19, 2019 / Accepted: Jan. 21, 2019 / Published: Jan. 23, 2019 (Year: 2018).*

(Continued)

*Primary Examiner* — Taiwo Oladapo
(74) *Attorney, Agent, or Firm* — Venable LLP (57) ABSTRACT

Provided is a lubricant composition having small shear rate dependence of its apparent viscosity. The lubricant composition includes a perfluoropolyether as a base oil, and fluorine resin particles as a thickener. The lubricant composition further includes a fluorine-containing polymer having a tetrafluoroethylene structure under a state in which the polymer is dissolved in the perfluoropolyether.

7 Claims, 2 Drawing Sheets

(51) Int. Cl.
   *C10M 107/38* (2006.01)
   *C10M 119/22* (2006.01)
   *C10M 147/04* (2006.01)
   *G03G 15/20* (2006.01)
   *C10N 40/14* (2006.01)

(52) U.S. Cl.
   CPC ....... *C10M 147/04* (2013.01); *G03G 15/2064* (2013.01); *C10M 2213/003* (2013.01); *C10M 2213/006* (2013.01); *C10M 2213/04* (2013.01); *C10M 2213/062* (2013.01); *C10M 2290/10* (2013.01); *C10N 2040/175* (2020.05); *G03G 2215/2016* (2013.01)

(58) Field of Classification Search
   CPC ...... C10M 2213/0606; C10M 2213/01; C10M 107/32; G03G 15/2064; G03G 2215/2016; G03G 15/2025; G03G 17/08; C10N 2040/175; C10N 2030/68; C10N 2040/00; C10N 2040/02; C10N 2040/04; C10N 2040/17; C10N 2040/18; C10N 2050/14; F16C 2210/02; F16C 2300/02; F16C 2370/38; F16C 33/109; F16C 33/6688
   See application file for complete search history.

(56) References Cited

U.S. PATENT DOCUMENTS

| | | |
   |---|---|---|
   | 5,494,596 A | 2/1996 | Law et al. |
   | 6,025,307 A | 2/2000 | Chittofrati et al. |
   | 6,060,205 A | 5/2000 | Takeichi et al. |
   | 8,258,090 B2 | 9/2012 | Avataneo et al. |
   | 8,278,256 B2 | 10/2012 | Marchionni et al. |
   | 8,703,668 B2 | 4/2014 | Melville et al. |
   | 9,014,611 B2 | 4/2015 | Ishii et al. |
   | 9,205,454 B2 | 12/2015 | Melville et al. |
   | 2014/0106162 A1 | 4/2014 | Junk et al. |

FOREIGN PATENT DOCUMENTS

| | | | |
   |---|---|---|---|
   | CN | 101652409 A | 2/2010 | |
   | CN | 104007644 A | 8/2014 | |
   | CN | 105906795 A | 8/2016 | |
   | EP | 0 866 114 A2 | 9/1998 | |
   | EP | 0866114 A2 * | 9/1998 | .......... C10M 137/04 |
   | EP | 2 770 377 A2 | 8/2014 | |
   | EP | 2 902 423 A2 | 8/2015 | |
   | IT | MI970656 A1 | 9/1998 | |
   | JP | 5-54368 A | 3/1993 | |
   | JP | 2007-39635 A | 2/2007 | |
   | JP | 5073986 B2 | 11/2012 | |
   | JP | 2014-186303 A | 10/2014 | |
   | JP | 2015-193858 A | 11/2015 | |
   | WO | WO-2018185026 A1 * | 10/2018 | .......... C10M 147/00 |

OTHER PUBLICATIONS

Extended European Search Report in European Application No. 20190416.6 (dated Dec. 2020).
   Chris D. Hahm et al., "High Shear Rate Viscosity Measurements of Perfluoropolyether Lubricants for Magnetic Thin-Film Rigid Disks," 81(8) J. Appl. Phys. 5384-5386 (Apr. 1997) (XP012042454).
   First Office Action in Chinese Application No. 202010830193.9 (dated Mar. 2022).
   Notification of Decision to Grant Patent Right in Chinese Application No. 202010830193.9 (dated Jun. 2022).

* cited by examiner

LUBRICANT COMPOSITION, SLIDING APPARATUS, FIXING APPARATUS, AND IMAGE-FORMING APPARATUS

BACKGROUND OF THE INVENTION

Field of the Invention

The present disclosure relates to a lubricant composition, a sliding apparatus, a fixing apparatus, and an image-forming apparatus.

Description of the Related Art

Fluorine grease generally used as a lubricant has a low vapor pressure, and hence has a feature in that its depletion due to evaporation and the generation of an outgas are suppressed even under a heated environment or under an evacuated environment. Accordingly, the grease has been widely used in industrial products, such as a copying machine and a semiconductor exposure apparatus.

The fluorine grease is generally a mixture containing, as main components, a perfluoropolyether that is a base oil and fluorine resin particles that are a solid thickener (Japanese Patent No. 5,073,986). Accordingly, it has been known that the grease behaves as a non-Newtonian fluid owing to structural viscosity by the thickener, and has shear rate dependence of its apparent viscosity.

When the fluorine grease is used as a lubricant for an apparatus sliding portion, the shear rate dependence of its apparent viscosity becomes a problem. This is because when the apparent viscosity of the lubricant changes in accordance with a change in shear rate of the apparatus sliding portion, variation in torque of the apparatus sliding portion may occur.

In view of the foregoing, one aspect of the present disclosure is directed to providing a lubricant composition having small shear rate dependence of its apparent viscosity.

Another aspect of the present disclosure is directed to providing a sliding apparatus including a sliding portion in which two members are brought into contact with each other through a lubricant composition, and at least one of the members is slidable with respect to another, the sliding apparatus hardly causing variation in torque even when a shear rate between the members changes.

Another aspect of the present disclosure is directed to providing a fixing apparatus including a sliding portion in which two members are brought into contact with each other through a lubricant composition, and at least one of the members is slidable with respect to another, the fixing apparatus hardly causing variation in torque even when a shear rate between the members changes.

Still another aspect of the present disclosure is directed to providing an image-forming apparatus including a sliding portion in which two members are brought into contact with each other through a lubricant composition, and at least one of the members is slidable with respect to another, the image-forming apparatus hardly causing variation in torque even when a shear rate between the members changes.

SUMMARY OF THE INVENTION

According to one aspect of the present disclosure, there is provided a lubricant composition including: a perfluoropolyether as a base oil; and fluorine resin particles as a thickener, wherein the lubricant composition further includes a fluorine-containing polymer having a tetrafluoroethylene structure under a state in which the polymer is dissolved in the perfluoropolyether.

According to another aspect of the present disclosure, there is provided a sliding apparatus including a sliding portion in which two members are brought into contact with each other through a lubricant composition, and at least one of the members is slidable with respect to another, wherein the lubricant composition is the above-mentioned lubricant composition.

According to another aspect of the present disclosure, there is provided a fixing apparatus including a sliding portion in which two members are brought into contact with each other through a lubricant composition, and at least one of the members is slidable with respect to another, wherein the lubricant composition is the above-mentioned lubricant composition.

In addition, according to another aspect of the present disclosure, there is provided a fixing apparatus including: a fixing belt having an endless shape; a pressurizing member; and a heater configured to heat the fixing belt with non-radiant heat, the fixing apparatus being configured to heat a recording medium having an unfixed toner image in a nip formed by the fixing belt and the pressurizing member to fix the unfixed toner image to the recording medium, wherein an inner peripheral surface of the fixing belt and at least a part of the heater are brought into contact with each other through a lubricant composition, and the lubricant composition is the above-mentioned lubricant composition.

Further, according to another aspect of the present disclosure, there is provided an image-forming apparatus including a sliding portion in which two members are brought into contact with each other through a lubricant composition, and at least one of the members is slidable with respect to another, wherein the lubricant composition is the above-mentioned lubricant composition.

Further features of the present disclosure will become apparent from the following description of exemplary embodiments with reference to the attached drawings.

DESCRIPTION OF THE EMBODIMENTS

A lubricant composition according to at least one embodiment of the present disclosure includes: a perfluoropolyether (hereinafter sometimes referred to as "PFPE") as a base oil; and fluorine resin particles as a thickener, wherein the lubricant composition further includes a fluorine-containing polymer having a tetrafluoroethylene structure under a state in which the polymer is dissolved in the PFPE.

The inventors have made extensive investigations, and as a result, have been able to reduce the apparent viscosity of the lubricant composition at a low shear rate by incorporating, into the composition, the fluorine-containing polymer having the tetrafluoroethylene structure under a state in which the polymer is dissolved in the PFPE. Meanwhile, the inventors have found that the apparent viscosity thereof at a high shear rate can be maintained, and hence the shear rate dependence of the apparent viscosity can be reduced.

The fluorine-containing polymer having the tetrafluoroethylene structure according to at least one embodiment of the present disclosure has a molecular weight higher than that of the PFPE that is the base oil, and the polymer is solid at room temperature, and hence the polymer is not dissolved merely by being added and mixed into the PFPE. Accordingly, when the fluorine-containing polymer having the tetrafluoroethylene structure is dispersed in a particle manner in the PFPE, the polymer may be a cause for the shear rate dependence of the apparent viscosity owing to its structural viscosity as in the fluorine resin particles as the thickener.

However, the inventors have found that the fluorine-containing polymer having the tetrafluoroethylene structure can be dissolved in the PFPE by performing operations, such as heating and stirring. Further, the inventors have found that the use of the PFPE as the base oil in the lubricant composition reduces the shear rate dependence of the apparent viscosity.

This is probably because the tetrafluoroethylene structure in the fluorine-containing polymer having the tetrafluoroethylene structure interacts with the fluorine resin particles that are the thickener to nonuniformly disperse the thickener, thereby reducing the structural viscosity of the lubricant composition.

In addition, as the shear rate dependence of the apparent viscosity of the lubricant composition reduces, when the lubricant composition is used in the sliding portion of a sliding apparatus, a change in torque of the sliding portion can be reduced in a wide shear rate range of from the shear rate of the apparatus at the time of its activation to that at the time of its steady driving.

[Lubricant Composition]

The lubricant composition according to at least one embodiment of the present disclosure is described in detail below based on a specific configuration.

(1) PFPE as Base Oil

The lubricant composition includes a PFPE as a base oil. The PFPE is a polymer containing a perfluoroalkylene ether as a repeating unit. Specific examples of the perfluoroalkylene ether include perfluoromethyl ether, perfluoroethyl ether, perfluoropropyl ether, and perfluoroisopropyl ether.

As the base oil to be used in the lubricant composition to be used under a high-temperature environment, from the viewpoint of the heat resistance of the composition, there is preferably used a PFPE having such a chemical structure that constituent atoms are formed only of a carbon atom, a fluorine atom, and an oxygen atom, and the atoms are bonded to each other by a single bond.

A commercial product may be used as the PFPE. Examples of the commercial product include, but not limited to, a PFPE represented by the structural formula (1) (e.g., Demnum S-200 and Demnum S-65 (each of which is a product name, manufactured by Daikin Industries, Ltd.)), a PFPE represented by the structural formula (2) (e.g., Krytox GPL-107, Krytox GPL-106, and Krytox GPL-105 (each of which is a product name, manufactured by Chemours Company)), a PFPE represented by the structural formula (3) (e.g., Fomblin M60 and Fomblin Z25 (each of which is a product name, manufactured by Solvay Specialty Polymers)), and a PFPE represented by the structural formula (4) (e.g., Fomblin Y45 and Fomblin Y25 (each of which is a product name, manufactured by Solvay Specialty Polymers)).

Structural formula (1)

In the Structural formula (1), "n1" represents a positive number, and "n1" represents a number within such a range that the kinematic viscosity of the PFPE represented by the structural formula (1) at 40° C. satisfies the range of from 10 mm²/s to 300 mm²/s.

Structural formula (2)

In the Structural formula (2), "n2" represents a positive number, and "n2" represents a number within such a range that the kinematic viscosity of the PFPE represented by the structural formula (2) at 40° C. satisfies the range of from 5 mm²/s to 1,200 mm²/s.

Structural formula (3)

In the Structural formula (3), "n3" and "m3" each represent a positive number, m3/n3 represents a number of 0.5 or more and 2 or less, and n3+m3 represents a number within such a range that the kinematic viscosity of the PFPE represented by the structural formula (3) at 40° C. satisfies the range of from 10 mm²/s to 900 mm²/s.

Structural formula (4)

In the Structural formula (4), "n4" and "m4" each represent a positive number, m4/n4 represents a number of 20 or more and 1,000 or less, and n4+m4 represents a number within such a range that the kinematic viscosity of the PFPE represented by the structural formula (4) at 40° C. satisfies the range of from 10 mm²/s to 700 mm²/s.

(2) Fluorine Resin Particles as Thickener

The lubricant composition includes fluorine resin particles as its thickener, and particles appropriately selected from particles utilized as thickeners for lubricants and the like may be utilized.

The particles of a polytetrafluoroethylene (hereinafter sometimes referred to as "PTFE") generally used as a thickener for fluorine grease are hard as compared to other fluorine resin particles, and are hence excellent in abrasion resistance. Accordingly, the particles are suitable as a thickener for a lubricant composition to be used in a sliding portion.

A commercial product may be used as the thickener. Examples of the commercial product include, but not limited to, POLYFLON PTFE LUBRON L-5F (product name, manufactured by Daikin Industries, Ltd.), Fluon PTFE L150J and Fluon PTFE L173JE (each of which is a product name, manufactured by AGC Inc.), and 3M DYNEON PTFE MICROPOWDER TF 9207Z (product name, manufactured by 3M Company).

The content of the thickener is from 10 mass % to 50 mass %, preferably from 15 mass % to 40 mass % of the entirety of the lubricant composition. When the amount of the thickener is set within the ranges, excellent slidability can be obtained.

The average particle diameter of the primary particles of the fluorine resin particles that are the thickener is preferably from 0.1 μm to 20.0 μm in terms of the value of a median diameter on a volume basis measured with a particle diameter distribution analyzer based on a laser scattering method. In particular, the average particle diameter is more preferably from 0.1 μm to 10.0 μm.

(3) Fluorine-Containing Polymer Having Tetrafluoroethylene Structure

The fluorine-containing polymer having the tetrafluoroethylene structure in the lubricant composition only needs to have the tetrafluoroethylene structure in its molecular chain, and for example, polymers given and listed below are used alone or in combination thereof.

A tetrafluoroethylene-perfluorodimethyldioxole copolymer, a tetrafluoroethylene-perfluoromethoxydioxole copolymer, a tetrafluoroethylene-perfluoro(butenyl vinyl ether) copolymer, a tetrafluoroethylene-perfluoro(alkyl vinyl ether) copolymer, a tetrafluoroethylene-hexafluoropropylene copolymer, a tetrafluoroethylene-perfluoro(methyl vinyl ether) copolymer, and a tetrafluoroethylene-perfluoropolyether copolymer.

In addition, the fluorine-containing polymer having the tetrafluoroethylene structure preferably has a heterocyclic structure having an oxygen atom as a heteroatom in addition to the tetrafluoroethylene structure. In addition, the polymer preferably has such a structure that an atom or a group selected from the group consisting of a fluorine atom, a perfluoroalkyl group having 1 to 3 carbon atoms, and a perfluoroalkoxy group having 1 to 3 carbon atoms is bonded to at least one carbon atom forming a ring structure in the heterocyclic structure.

When the fluorine-containing polymer having the tetrafluoroethylene structure has the heterocyclic structure, the dissolution of the polymer in the PFPE is facilitated, and hence the shear rate dependence of the apparent viscosity can be more satisfactorily adjusted.

In addition, the heterocyclic structure is more preferably a fluorine-containing oxolane structure represented by the following structural formula (5) or a fluorine-containing dioxolane structure represented by the following structural formula (6).

Structural formula (5)

Structural formula (6)

In the Structural formulae (5) and (6), R1 to R10 each independently represent an atom or a group selected from the group consisting of a fluorine atom, a perfluoroalkyl group having 1 to 3 carbon atoms, and a perfluoroalkoxy group having 1 to 3 carbon atoms.

Herein, the total sum of the mole fraction of the fluorine-containing dioxolane structure and the mole fraction of the fluorine-containing oxolane structure in the fluorine-containing polymer having the tetrafluoroethylene structure is preferably from 10 mol % to 90 mol %, more preferably from 30 mol % to 70 mol %, still more preferably from 40 mol % to 60 mol %.

A commercial product may be used as the fluorine-containing polymer having the tetrafluoroethylene structure. Examples of the commercial product include Teflon (trademark) AF series (e.g., AF 1600X and AF 2400X (each of which is a product name), manufactured by Chemours-Mitsui Fluoroproducts Co., Ltd.) represented by the structural formula (7) and Algoflon AD series (e.g., Algoflon AD 40L and Algoflon AD 60 (each of which is a product name, manufactured by Solvay Specialty Polymers) represented by the structural formula (8).

Structural formula (7)

In the Structural formula (7), "n7" and "m7" each independently represent an integer of 1 or more.

Structural formula (8)

In the Structural formula (8), "n8" and "m8" each independently represent an integer of 1 or more.

Herein, the mole fraction of the tetrafluoroethylene structure in the fluorine-containing polymer having the tetrafluoroethylene structure is preferably from 10 mol % to 90 mol %, more preferably from 30 mol % to 70 mol %, still more preferably from 40 mol % to 60 mol %.

A method of dissolving the fluorine-containing polymer having the tetrafluoroethylene structure in the PFPE is described. With regard to the dissolution method, the following methods are given as simple approaches, but the dissolution method is not limited thereto.

(a) The fluorine-containing polymer having the tetrafluoroethylene structure is added to the PFPE, and the mixture is heated at a temperature equal to or more than the glass transition point of the fluorine-containing polymer having the tetrafluoroethylene structure measured in advance, and is stirred.

(b) The fluorine-containing polymer having the tetrafluoroethylene structure is dissolved in a solvent capable of dissolving the polymer in advance, and the solution is added to the PFPE, followed by sufficient mixing. After that, the mixture is heated to a temperature equal to or more than the boiling point of the solvent to volatilize the used solvent.

(c) The fluorine-containing polymer having the tetrafluoroethylene structure is added to fluorine grease containing the PFPE, and under the sliding environment under which the grease is used, the mixture is used at a temperature equal to or more than the glass transition point of the fluorine-containing polymer having the tetrafluoroethylene structure measured in advance.

At least a part of the fluorine-containing polymer having the tetrafluoroethylene structure is preferably dissolved in the PFPE. The presence or absence of the dissolution of the fluorine-containing polymer having the tetrafluoroethylene structure in the PFPE may be confirmed by, for example, the following method.

First, the thickener in the lubricant composition is sedimented by subjecting the lubricant composition to centrifugal separation, and only the base oil and the fluorine-containing polymer having the tetrafluoroethylene structure, which has been dissolved in the base oil, are extracted as a supernatant. At this time, to facilitate the sedimentation of the thickener, the lubricant composition is preferably diluted. The lubricant composition to be subjected to the centrifugal separation is diluted twofold by using a hydrofluoroether (e.g., a product available under the product name "Novec 7300" from 3M Company) as a diluent. After the dilution, the thickener is sedimented by performing the centrifugal separation under the following conditions.

At this time, when the fluorine-containing polymer having the tetrafluoroethylene structure is not dissolved in the PFPE, the fluorine-containing polymer having the tetrafluoroethylene structure is centrifuged, and hence the supernatant contains only the PFPE and the hydrofluoroether.

(Extraction by Centrifugation)
Apparatus name: High Speed Refrigerated Centrifuge 7780 (manufactured by Kubota
Corporation Co., Ltd.)
Rotor: microrotor A-224
Sample tube: 1.5 mL
Number of revolutions: 20,000 rpm
Centrifugal force: 36,670×g
Temperature: 40° C.
Time: 30 min Subsequently, hexafluoro-2-propanol (hereinafter referred to as "HFIP") is added to the resultant supernatant, and only the PFPE component is subjected to solvent extraction. To completely extract the PFPE component, 1 mL or more of HFIP is preferably added to about 1 mg of the resultant supernatant. The fluorine-containing polymer having the tetrafluoroethylene structure is insoluble in HFIP, and hence can be collected with a polypropylene-made filter having a pore diameter of 0.45 Herein, the structure of the collected fluorine-containing polymer having the tetrafluoroethylene structure may be identified through the analysis of the polymer by, for example, Fourier transform infrared spectroscopy or NMR.

The fluorine-containing polymer having the tetrafluoroethylene structure is added at a ratio of from 0.05 mass % to 10.00 mass %, preferably from 0.5 mass % to 5 mass % with respect to the PFPE in the lubricant composition.

In addition, an additive to be typically blended in the lubricant composition, such as a heat conductive filler, a solid lubricant, an antioxidant, an extreme pressure agent, an oiliness agent, a rust inhibitor, a corrosion inhibitor, a metal deactivator, a dye, a hue stabilizer, a viscosity index improver, or a structure stabilizer, may be added to the lubricant composition as long as the heat resistance and the sliding property are not impaired.

With regard to a method of producing the lubricant composition, the composition may be produced by, for example, adding and mixing the PFPE having dissolved therein the fluorine-containing polymer having the tetrafluoroethylene structure and the fluorine resin particles, and any other required additive. A known mixing apparatus, such as a mixer, a roll mill, a planetary mixer, or a homogenizer, may be used as a mixing apparatus.

Further, in addition to the above-mentioned processing method, filtration, decompression, pressurization, heating, cooling, inert gas purging, and the like may be performed alone or in combination thereof as required.

[Sliding Apparatus]

The lubricant composition may be widely applied to applications where fluorine grease has heretofore been used. Specifically, the composition is used for the purpose of lubricating a contact portion between the individuals of a sliding portion, such as a ball bearing, a plain bearing, a sintered bearing, a guide rail, a LM guide, a ball screw, an air cylinder, a gear, a valve, a cock, an oil seal, or an electrical contact. Examples of the sliding portion include: a bearing for an automobile auxiliary machine typified by, for example, the hub unit, traction motor, fuel injection apparatus, or alternator of an automobile; and the gear portion of, for example, a power transmission apparatus, a power window motor, or a wiper. The examples also include: a bearing for a hard disk, a flexible disk storage apparatus, a compact disc drive, or a magneto-optical disk drive to be used in information equipment; and a sliding portion typified by the fixing roll portion of, for example, a copying machine, a printer, or a facsimile. The examples also include: a sliding portion, such as a bearing, a LM guide, or a gear, to be used in a vacuum pump, a semiconductor-producing apparatus, a resin-producing apparatus, or a conveyor; and the sliding portion of rolls that are brought into sliding contact with each other. The composition effectively lubricates the surface of a metal used in, for example, an electrical contact of electrical equipment used in, for example, a breaker, a relay, or a switch. In particular, the composition may be suitably used in a sliding portion in the fixing apparatus of a copying machine, and a sliding portion, such as a bearing or a rail, to be used in a semiconductor-producing apparatus. Thus, there can be obtained a sliding apparatus including a sliding portion in which two members are brought into contact with each other through the lubricant composition, and at least one of the two members is slidable with respect to the other.

[Fixing Apparatus]

Figure 1A:
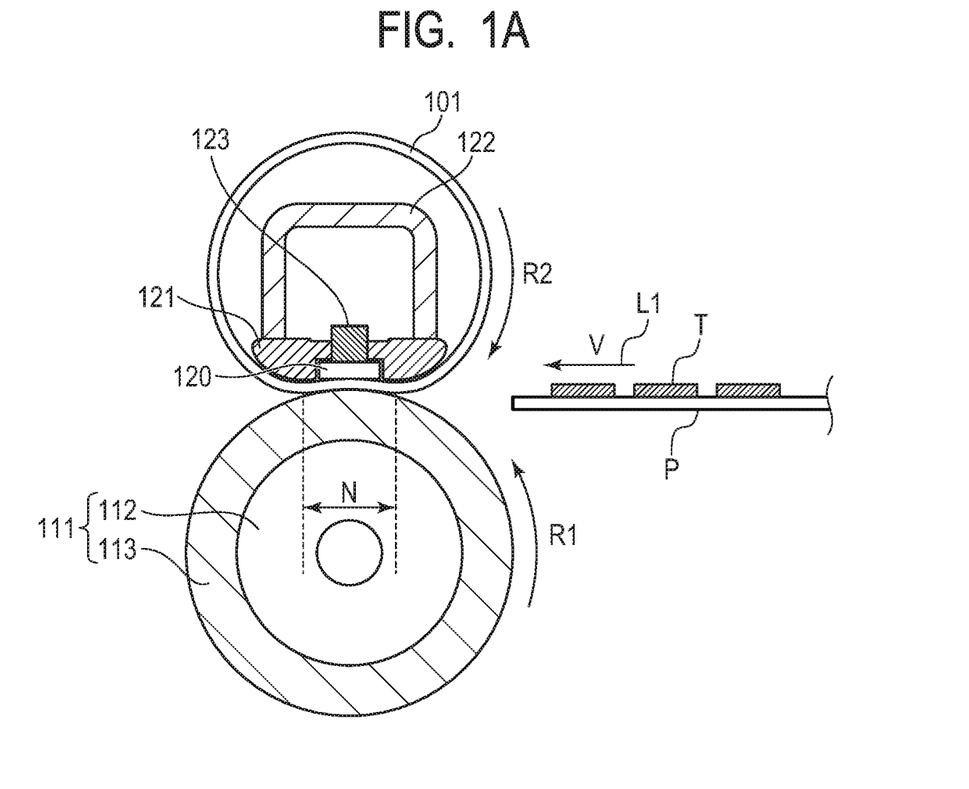
FIG. 1A is an example of a schematic sectional view of a fixing apparatus using a lubricant composition according to one aspect of the present disclosure.
Figure 1B:
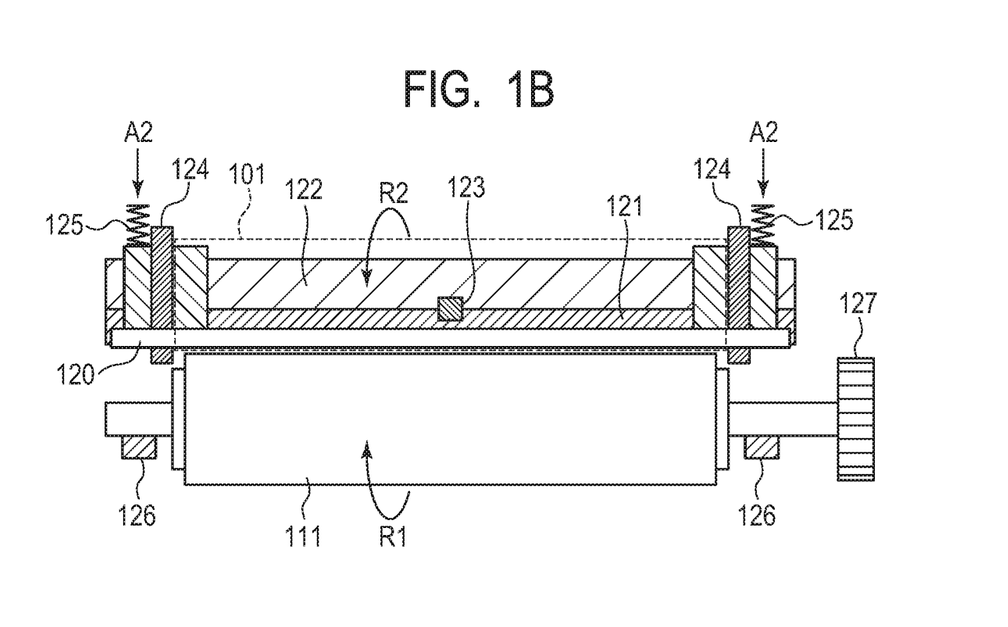
FIG. 1B is an example of a schematic sectional view of the fixing apparatus using the lubricant composition according to one aspect of the present disclosure when viewed from a recording medium-conveying direction.

FIG. 1A and FIG. 1B are each a schematic explanatory view of a fixing apparatus according to one aspect of the present disclosure.

FIG. 1A is a sectional view when the fixing apparatus is viewed from a direction perpendicular to the conveying direction of a recording medium P (arrow L1), and FIG. 1B is a view when the apparatus is viewed from the upstream side of the conveying direction of the recording medium P.

In the fixing apparatus, a fixing belt 101 has an endless shape. A belt guide member 121 molded out of a resin having heat resistance and a heat-insulating property is formed for holding the fixing belt 101.

The fixing apparatus includes a ceramic heater 120 as a heat source at the position at which the belt guide member 121 and the inner surface of the fixing belt 101 are brought into contact with each other.

In addition, the lubricant composition is interposed between the surface of the ceramic heater 120, which is one sliding member and is a heater configured to heat the fixing belt with non-radiant heat, and the inner peripheral surface of the fixing belt 101 as the other sliding member (not shown). That is, the surface of the ceramic heater 120 and the inner peripheral surface of the fixing belt 101 are brought into contact with each other through the lubricant composition. Thus, the slidability of the fixing belt 101 with respect to the ceramic heater 120 is improved. In addition, the shear rate dependence of the apparent viscosity of the lubricant composition is small. Accordingly, even when the shear rate of the fixing belt 101 with respect to the ceramic heater 120 changes, variation in torque of a sliding portion hardly occurs.

The ceramic heater 120 is fixed and supported by being fit into a groove portion molded and included along the longitudinal direction of the belt guide member 121.

A hole configured to store a temperature-detecting element (thermistor) 123 arranged so as to be brought into contact with the ceramic heater 120 is arranged in a central portion in the longitudinal direction of the belt guide member 121.

Electric power is supplied from a power source apparatus (not shown) to the ceramic heater 120 to increase its temperature. The temperature of the ceramic heater 120 is detected by the thermistor 123, and the detected information is fed back to a control circuit portion (not shown). The control circuit portion controls the electric power input from the power source apparatus to the ceramic heater 120 so that the detected temperature input from the thermistor 123 may be maintained at a predetermined target temperature.

The fixing belt 101 having a seamless shape is loosely fit onto a flange member 124. A rigid stay 122 for pressurization is inserted into the inside of the flange member 124.

A pressurizing roller 111 as a pressurizing member is such that a silicone rubber elastic layer 113 is arranged on a stainless-steel mandrel 112 to reduce its surface hardness. The pressurizing roller 111 is arranged by being held so as to freely rotate through use of bearings 126 in both end portions of the mandrel 112. In addition, the driving force of a motor (driving source) controlled by a control portion (not shown) is transmitted to a driving gear 127 arranged in the mandrel through a power transmission mechanism (not shown). Thus, the pressurizing roller 111 is rotationally driven in a direction indicated by the arrow R1 in FIG. 1A at a predetermined speed. Then, the fixing belt 101 rotates in a direction indicated by the arrow R2 following the rotation of the pressurizing roller 111.

To improve the surface property and releasability of the pressurizing roller 111, the roller is covered with a fluorine resin tube having a thickness of 50 μm, the tube as a surface layer.

A pressurizing spring 125 is arranged under a contracted state between each of both end portions of the rigid stay 122 for pressurization and a spring-receiving member (not shown) on an apparatus chassis side to apply a depressing force A2 to the rigid stay 122 for pressurization. Thus, the lower surface of the ceramic heater 120 arranged on the lower surface of the belt guide member 121 and the upper surface of the pressurizing roller 111 are brought into press contact with each other with the fixing belt 101 sandwiched therebetween, thereby forming a predetermined fixing nip N.

The recording medium P as a body to be heated, on which unfixed toner images have been formed with an unfixed toner T, is conveyed to the fixing nip N at a conveying velocity V so as to be sandwiched between the fixing belt and the pressurizing roller. Thus, the toner images are heated and pressurized. As a result, the toner images are melted and subjected to color mixing. After that, when the toner images are cooled, the toner images are fixed onto the recording medium P.

[Image-Forming Apparatus]

An image-forming apparatus is, for example, a multifunction machine, a copying machine, a facsimile, or a printer using an electrophotographic system. Herein, the overall configuration of the image-forming apparatus is schematically described by using a color laser printer as an example.

Figure 2:
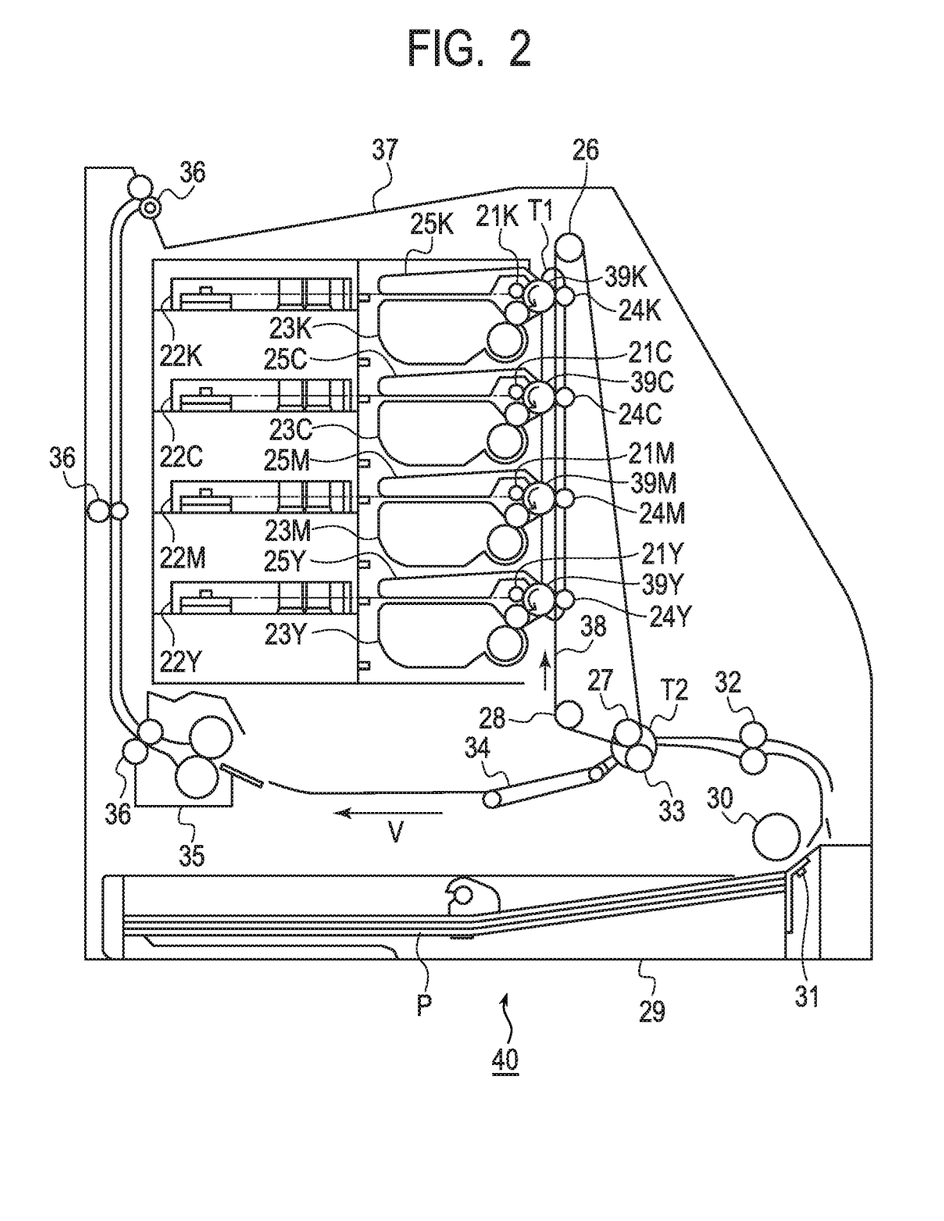
FIG. 2 is a schematic sectional view for illustrating one aspect of an image-forming apparatus according to one aspect of the present disclosure.

FIG. 2 is a schematic sectional view of a color laser printer according to one aspect of the present disclosure. A color laser printer (hereinafter referred to as "printer") 40 illustrated in FIG. 2 includes, for each of yellow (Y), magenta (M), cyan (C), and black (K) colors, an image-forming portion including an electrophotographic photosensitive drum (hereinafter referred to as "photosensitive drum") configured to rotate at a constant speed. In addition, the printer includes an intermediate transfer member 38 configured to hold color images, which have been developed in the image-forming portions and transferred in a multiple manner, and to further transfer the images onto the recording medium P fed from a feeding portion.

Photosensitive drums 39 (39Y, 39M, 39C, and 39K) are each rotationally driven counterclockwise by a driving unit (not shown).

A charging apparatus 21 (21Y, 21M, 21C, or 21K) configured to uniformly charge the surface of each of the photosensitive drums 39, a scanner unit 22 (22Y, 22M, 22C, or 22K) configured to irradiate the photosensitive drum 39 with laser beam based on image information to form an electrostatic latent image thereon, a developing unit 23 (23Y, 23M, 23C, or 23K) configured to cause toner to adhere to the electrostatic latent image to develop the image as a toner image, a primary transfer roller 24 (24Y, 24M, 24C, or 24K) configured to transfer the toner image on the photosensitive drum 39 onto the intermediate transfer member 38 in a primary transfer portion T1, and a cleaning unit 25 (25Y, 25M, 25C, or 25K) including a cleaning blade configured to remove transfer residual toner remaining on the surface of the photosensitive drum 39 after the transfer are sequentially arranged around the photosensitive drum 39 in accordance with its rotation direction.

At the time of image formation, the intermediate transfer member 38 having a belt shape, which is suspended over rollers 26, 27, and 28, rotates, and the toner images of the respective colors formed on the respective photosensitive drums 39 are primarily transferred onto the intermediate transfer member 38 in a superimposed manner. Thus, a color image is formed.

In synchronization with the primary transfer onto the intermediate transfer member 38, the recording medium P is conveyed to a secondary transfer portion T2 by a conveying unit. The conveying unit includes: a feeding cassette 29 storing the plurality of recording mediums P; a feeding roller 30; a separating pad 31; and a registration roller pair 32. At the time of the image formation, the feeding roller 30 is driven to rotate in accordance with an image-forming operation to separate the recording mediums P in the feeding cassette 29 one by one, and the separated recording medium P is conveyed to the secondary transfer portion T2 by the registration roller pair 32 in timing with the image-forming operation.

A secondary transfer roller 33 that can move is arranged in the secondary transfer portion T2. The secondary transfer roller 33 can move in a substantially vertical direction. In addition, at the time of image transfer, the secondary transfer roller 33 is pressed against the intermediate transfer member 38 at a predetermined pressure through the recording medium P. At the same time, a bias is applied to the secondary transfer roller 33, and hence the toner image on the intermediate transfer member 38 is transferred onto the recording medium P.

The intermediate transfer member 38 and the secondary transfer roller 33 are each driven, and hence the recording medium P in a state of being sandwiched therebetween is conveyed in a left arrow direction illustrated in FIG. 2 at the predetermined conveying velocity V. Further, the recording material is conveyed to a fixing portion 35 that is the next step by a conveying belt 34. In the fixing portion 35, heat and a pressure are applied to fix the transferred toner image onto the recording medium P. The recording medium P is discharged onto a discharge tray 37 on the upper surface of the apparatus by discharge roller pairs 36.

In addition, when the fixing apparatus according to at least one embodiment of the present disclosure illustrated in each of FIG. 1A and FIG. 1B is applied to the fixing portion 35 of the electrophotographic image-forming apparatus illustrated in FIG. 2, an image-forming apparatus that can provide a high-quality image excellent in image uniformity can be obtained.

This embodiment has been described above, but this embodiment is not construed as being limited to the abovementioned mode, and needless to say, various changes, modifications, and improvements thereof may be achieved to the extent that the requirements of this embodiment are satisfied.

According to one aspect of the present disclosure, the lubricant composition having small shear rate dependence of its apparent viscosity can be obtained.

According to another aspect of the present disclosure, there can be obtained the sliding apparatus including the sliding portion in which the two members are brought into contact with each other through the lubricant composition, and at least one of the members is slidable with respect to the other, the sliding apparatus hardly causing variation in torque even when the shear rate between the members changes. According to another aspect of the present disclosure, there can be obtained the fixing apparatus including the sliding portion in which the two members are brought into contact with each other through the lubricant composition, and at least one of the members is slidable with respect to the other, the fixing apparatus hardly causing variation in torque even when the shear rate between the members changes.

According to still another aspect of the present disclosure, there can be obtained the image-forming apparatus including the sliding portion in which the two members are brought into contact with each other through the lubricant composition, and at least one of the members is slidable with respect to the other, the image-forming apparatus hardly causing variation in torque even when the shear rate between the members changes.

EXAMPLES

The lubricant composition, the sliding apparatus, the fixing apparatus, and the image-forming apparatus according to at least one embodiment of the present disclosure are specifically described below by way of Examples. The lubricant composition, the sliding apparatus, the fixing apparatus, and the image-forming apparatus according to at least one embodiment of the present disclosure are not limited to configurations embodied in the following examples.

In Examples, lubricant compositions were produced by using PFPEs, fluorine resin particles, and fluorine-containing polymers each having a tetrafluoroethylene structure described below.

PFPE (hereinafter referred to as "base oil")

Base oil-1 (product name: Krytox GPL-107, manufactured by Chemours Company)

The base oil-1 is represented by the structural formula (1), and has a kinematic viscosity at a temperature of 40° C. of 450 $mm^2/s$.

Base oil-2 (product name: Demnum S-200, manufactured by Daikin Industries, Ltd.)

The base oil-2 is represented by the structural formula (2), and has a kinematic viscosity at a temperature of 40° C. of 200 $mm^2/s$.

Base oil-3 (product name: Fomblin M60, manufactured by Solvay Specialty Polymers)

The base oil-3 is represented by the structural formula (3), and has a kinematic viscosity at a temperature of 40° C. of 310 $mm^2/s$, and m/n is a number that falls within the range of from 0.8 to 0.9.

Fluorine-containing polymer having a tetrafluoroethylene structure (hereinafter referred to as "additive")

Additive-1 (product name: Teflon (trademark) AF 1600X, manufactured by Chemours-Mitsui Fluoroproducts Co., Ltd.)

The additive-1 is represented by the structural formula (7), and has a glass transition temperature of 160° C.

Additive-2 (product name: Teflon (trademark) AF 2400X, manufactured by Chemours-Mitsui Fluoroproducts Co., Ltd.)

The additive-2 is represented by the structural formula (7), and has a glass transition temperature of 240° C.

Additive-3 (product name: Algoflon AD 60, manufactured by Solvay Specialty Polymers)

The additive-3 is represented by structural formula (8), and has a glass transition temperature of 125° C.

Additive-4 (product name: Algoflon AD 40L, manufactured by Solvay Specialty Polymers)

The additive-4 is represented by the structural formula (8), and has a glass transition temperature of 95° C.

Fluorine Resin Particles (hereinafter referred to as "thickener")

Thickener-1 (product name: Lubron L-5F, manufactured by Daikin Industries, Ltd.)

Thickener-2 (product name: Fluon PTFE L150J, manufactured by AGC Inc.)

Thickener-3 (product name: Fluon PTFE L172JE, manufactured by AGC Inc.)

Example 1

The base oil-1 was mixed with the additive-1 so that the amount of the additive dissolved in the base oil-1 became 1 mass %. After that, the mixture was heated to 300° C., which was equal to or more than the glass transition point (160° C.) of the additive-1, and was held for 5 hours while being stirred. Thus, the additive was dissolved in the base oil.

The thickener-1 was added to the base oil-1 having dissolved therein the additive-1 so that the ratio of the thickener to a lubricant composition to be obtained became 30 mass %. After that, the materials were mixed with a planetary mixer (product name: ARV-310, manufactured by THINKY CORPORATION) under atmospheric pressure at a number of revolutions of 2,000 rpm for 10 minutes to prepare the lubricant composition according to this example. The lubricant composition was a white semisolid.

The fact that the resultant lubricant composition included the additive-1 under a state in which the additive was dissolved in the base oil-1 was confirmed as described below.

That is, first, the lubricant composition was diluted with a fluorine-based solvent containing a hydrofluoroether (product name: Novec 7300, manufactured by 3M Company) twofold on a mass basis to provide a diluted product. The diluted product was subjected to centrifugal separation under the following conditions to be separated into a sediment containing the thickener-1 and a supernatant.

Apparatus name: High Speed Refrigerated Centrifuge 7780 (manufactured by Kubota Corporation Co., Ltd.)
Rotor: microrotor A-224
Sample tube: 1.5 mL
Number of revolutions: 20,000 rpm
Centrifugal force: 36,670×g
Temperature: 40° C.
Time: 30 min Next, HFIP was added to the resultant supernatant in an amount of 1 mL per 1 mg of the supernatant so that the base oil-1 in the supernatant was dissolved in HFIP. After that, the HFIP-insoluble matter was collected with a polypropylene-made filter having a pore diameter of 0.45 µm. The collected insoluble matter was subjected to $^{19}$F-NMR measurement, and as a result, a chemical shift derived from a structure represented by the structural formula (7) was observed. Thus, it was confirmed that the lubricant composition according to this example included the additive-1, which was a fluorine-containing polymer having a tetrafluoroethylene structure, under a state in which the additive was dissolved in the base oil-1.

Examples 2 to 12

Lubricant compositions according to the respective examples were each prepared in the same manner as in Example 1 except that the kind of the base oil, the kind of the additive, the kind of the thickener, and their addition amounts were changed as shown in Table 1. The fact that the lubricant compositions according to the respective examples each included any one of the additive-1 to the additive-4 under a state in which the additive was dissolved in any one of the base oil-1 to the base oil-3 was confirmed by the same method as the method described in Example 1.

Example 13

OPTEON SF10 (product name, manufactured by Chemours-Mitsui Fluoroproducts Co., Ltd.) that was a fluorine-based solvent was added to the additive-1 so that the concentration of the additive became 10 mass %. While the mixture was stirred at room temperature, the mixture was held for 10 hours so that the additive was dissolved in the solvent. Thus, a mixed solution of the additive-1 and the solvent was obtained.

After the dissolution, the mixed solution was added to the base oil-1 so that the amount of the additive-1 dissolved in the base oil became 5 mass %. While the materials were stirred at room temperature, the materials were held for 5 hours so as to be sufficiently mixed. After the mixing, the solvent was volatilized by heating the mixture to 120° C. while stirring the mixture. Thus, the base oil-1 having dissolved therein the additive-1 was obtained.

After that, in the same manner as in Example 1, the thickener-1 was added to the base oil-1 having dissolved therein the additive-1 so that the ratio of the thickener to a lubricant composition to be obtained became 30 mass %. After that, the materials were mixed in the same manner as in Example 1 to prepare the lubricant composition according to this example. The lubricant composition was a white semisolid. The fact that the lubricant composition according to this example included the additive-1 under a state in which the additive was dissolved in the base oil-1 was confirmed by the same method as the method described in Example 1.

Comparative Example 1

In the preparation of the lubricant composition according to Example 1, the thickener-1 was added to the base oil-1 so that the ratio of the thickener to a lubricant composition to be obtained became 30 mass %. After that, the materials were mixed with a planetary mixer (product name: ARV-310, manufactured by THINKY CORPORATION) under atmospheric pressure at a number of revolutions of 2,000 rpm for 10 minutes to prepare the lubricant composition according to this comparative example. The resultant lubricant composition was a white semisolid.

The resultant lubricant composition was diluted with a fluorine-based solvent containing a hydrofluoroether (product name: Novec 7300, manufactured by 3M Company) twofold on a mass basis to provide a diluted product. The diluted product was subjected to centrifugal separation under the same conditions as the conditions in Example 1 to be separated into a sediment containing the thickener-1 and a supernatant.

Next, HFIP was added to the resultant supernatant in an amount of 1 mL per 1 mg of the supernatant so that the base oil-1 in the supernatant was dissolved in HFIP. As a result, no HFIP-insoluble matter was observed. That is, it was confirmed that the lubricant composition according to this comparative example did not include the additive-1 to be included under a state of being dissolved in the base oil-1.

Methods of evaluating the lubricant compositions are described in detail below.

(Apparent Viscosity Evaluation)

The apparent viscosity of each of the lubricant compositions was measured with a capillary-type rheometer (product name: ROSAND RH2000, manufactured by Malvern Panalytical Ltd.). The lubricant composition defoamed in advance was loaded into a barrel having a diameter of φ15 mm, and a die having a hole diameter of φ0.5 mm, a length of 16 mm, and an angle of incidence of 90° was used to extrude the composition. The apparent viscosity was calculated from a pressure in the barrel when the lubricant composition was extruded while a shear rate to be applied to the lubricant composition at a temperature of 50° C. was set to 10 $s^{-1}$ (evaluation at a low shear rate) or 10,000 $s^{-1}$ (evaluation at a high shear rate).

(Torque Evaluation)

In this test, a monochromatic laser beam printer (product name: Satera LBP312i, manufactured by Canon Inc.) (hereinafter referred to as "LBP") was used as an image-forming apparatus.

A specific evaluation procedure is as described below. A fixing apparatus assembled after 300 mg of any one of the lubricant compositions prepared in advance had been applied onto its ceramic heater was incorporated into the LBP. After the image-forming apparatus had been assembled, the set temperature of the heater was set to 210° C., and the image-forming apparatus was idled for 10 minutes to conform the composition to its sliding portion. After that, the fixing apparatus was sufficiently cooled until its temperature became room temperature. After that, a torque on the shaft of the pressurizing roller of the fixing apparatus when the set temperature of the heater was set to 50° C. and the surface speed of the pressurizing roller was set to 250 mm/sec was measured. An activation torque was defined as the maximum torque immediately after the initiation of the activation of the image-forming apparatus, and a steady torque was defined as the average of torques in the last 15 seconds of the 10-minute period.

The lubricant compositions according to Examples 1 to 13 and Comparative Example 1 were each subjected to the apparent viscosity evaluation and the torque evaluation. The results are shown in Table 1 and Table 2.

TABLE 1

| | Material composition | | | |
|---|---|---|---|---|
| | Kind of base oil | Ratio of base oil to lubricant composition (mass %) | Kind of additive | Ratio of additive to lubricant composition (mass %) A numerical value in ( ) is the amount of an additive dissolved in a base oil (mass %). |
| Example 1 | Base oil-1 | 69.3 | Additive-1 | 0.7 (1) |
| Example 2 | Base oil-1 | 69.7 | Additive-1 | 0.4 (0.5) |
| Example 3 | Base oil-1 | 66.5 | Additive-1 | 3.5 (5) |
| Example 4 | Base oil-1 | 70.0 | Additive-1 | 0.035 (0.05) |
| Example 5 | Base oil-1 | 63.0 | Additive-1 | 7 (10) |
| Example 6 | Base oil-2 | 69.3 | Additive-2 | 0.7 (1) |
| Example 7 | Base oil-1 | 69.3 | Additive-3 | 0.7 (1) |
| Example 8 | Base oil-3 | 69.3 | Additive-4 | 0.7 (1) |
| Example 9 | Base oil-1 | 49.5 | Additive-1 | 0.5 (1) |
| Example 10 | Base oil-1 | 59.4 | Additive-1 | 0.6 (1) |
| Example 11 | Base oil-1 | 84.2 | Additive-1 | 0.85 (1) |
| Example 12 | Base oil-1 | 89.1 | Additive-1 | 0.9 (1) |
| Example 13 | Base oil-1 | 66.5 | Additive-1 | 3.5 (5) |
| Comparative Example 1 | Base oil-1 | 70.0 | — | 0 0 |

| | Material composition | | | | |
|---|---|---|---|---|---|
| | Kind of thickener | Ratio of thickener to lubricant composition (mass %) | Viscosity at low shear rate Pa · s at 10 s$^{-1}$ | Viscosity at high shear rate Pa · s at 10,000 s$^{-1}$ | Ratio (viscosity at low shear rate/viscosity at high shear rate) of viscosity at low shear rate to viscosity at high shear rate |
| Example 1 | Thickener-1 | 30 | 21.3 | 3.1 | 6.9 |
| Example 2 | Thickener-1 | 30 | 76.0 | 2.6 | 29.2 |
| Example 3 | Thickener-1 | 30 | 12.1 | 4.4 | 2.8 |
| Example 4 | Thickener-1 | 30 | 98.5 | 2.5 | 39.4 |
| Example 5 | Thickener-1 | 30 | 8.6 | 5.5 | 1.6 |
| Example 6 | Thickener-1 | 30 | 16.0 | 3.0 | 5.3 |
| Example 7 | Thickener-1 | 30 | 22.2 | 2.8 | 7.9 |
| Example 8 | Thickener-1 | 30 | 14.2 | 3.4 | 4.2 |
| Example 9 | Thickener-2 | 50 | 79.2 | 5.2 | 15.2 |
| Example 10 | Thickener-3 | 40 | 77.1 | 4.3 | 17.9 |
| Example 11 | Thickener-1 | 15 | 15.2 | 2.6 | 5.8 |
| Example 12 | Thickener-1 | 10 | 12.3 | 2.3 | 5.3 |
| Example 13 | Thickener-1 | 30 | 11.9 | 2.8 | 4.3 |
| Comparative Example 1 | Thickener-1 | 30 | 181.0 | 2.5 | 73.3 |

TABLE 2

| | Torque evaluation | |
| --- | --- | --- |
| | Activation torque kgf · cm | Steady torque kgf · cm |
| Example 1 | 7.0 | 3.3 |
| Example 2 | 8.3 | 3.1 |
| Example 3 | 6.3 | 4.1 |
| Example 4 | 9.8 | 3.0 |
| Example 5 | 6.1 | 5.1 |
| Example 6 | 6.7 | 3.5 |
| Example 7 | 7.2 | 3.2 |
| Example 8 | 6.4 | 3.6 |
| Example 9 | 8.9 | 4.3 |
| Example 10 | 8.4 | 3.9 |
| Example 11 | 6.6 | 3.1 |
| Example 12 | 6.2 | 3.0 |
| Example 13 | 6.2 | 3.2 |
| Comparative Example 1 | 15.8 | 3.0 |

It was found from the results shown in Table 1 that the apparent viscosity of the lubricant composition according to at least one embodiment of the present disclosure at a low shear rate was able to be reduced, and the apparent viscosity thereof at a high shear rate was able to be maintained, and hence the shear rate dependence of the apparent viscosity was able to be reduced. In addition, it was found from Table 2 that the composition was able to reduce a change in torque in a wide shear rate region, and was hence able to be suitably used even when a change in shear rate was large.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-153016, filed Aug. 23, 2019, which is hereby incorporated by reference herein in its entirety.

What is claimed is:

1. A lubricant composition comprising:
a perfluoropolyether as a base oil;
fluorine resin particles as a thickener; and
a fluorine-containing polymer having a tetrafluoroethylene structure under a state in which the fluorine-containing polymer is dissolved in the perfluoropolyether,
wherein the fluorine resin particles are particles of polytetrafluoroethylene,
wherein the fluorine-containing polymer has a structure represented by structural formula (7) or structural formula (8):

(7)

where n7 and m7 each independently represents an integer of 1 or more, (8)

where n8 and m8 each represents an integer of 1 or more,
wherein a content of the fluorine resin particles in the lubricant composition is 10 mass % to 50 mass %, and
wherein an amount of the fluorine-containing polymer dissolved in the perfluoropolyether with respect to the perfluoropolyether is from 0.05 mass % to 10.00 mass %.

2. The lubricant composition according to claim 1, wherein a mole fraction of a fluorine-containing dioxolane structure in the fluorine-containing polymer is from 10 mol % to 90 mol %.

3. The lubricant composition according to claim 1, wherein a mole fraction of the tetrafluoroethylene structure in the fluorine-containing polymer is from 10 mol % to 90 mol %.

4. A sliding apparatus comprising a sliding portion in which two members are brought into contact with each other through a lubricant composition, and at least one of the members is slidable with respect to another,
wherein the lubricant composition comprises:
a perfluoropolyether as a base oil;
fluorine resin particles as a thickener; and
a fluorine-containing polymer having a tetrafluoroethylene structure under a state in which the fluorine-containing polymer is dissolved in the perfluoropolyether,
wherein the fluorine resin particles are particles of polytetrafluoroethylene,
wherein the fluorine-containing polymer has a structure represented by structural formula (7) or structural formula (8):

(7)

where n7 and m7 each independently represents an integer of 1 or more, (8)

where n8 and m8 each represents an integer of 1 or more,
wherein a content of the fluorine resin particles in the lubricant composition is 10 mass % to 50 mass %, and
wherein an amount of the fluorine-containing polymer dissolved in the perfluoropolyether with respect to the perfluropolyether is from 0.05 mass % to 10.00 mass %.

5. A fixing apparatus comprising a sliding portion in which two members are brought into contact with each other through a lubricant composition, and at least one of the members is slidable with respect to another,
wherein the lubricant composition comprises:
a perfluoropolyether as a base oil;
fluorine resin particles as a thickener; and
a fluorine-containing polymer having a tetrafluoroethylene structure under a state in which the fluorine-containing polymer is dissolved in the perfluoropolyether,
wherein the fluorine resin particles are particles of polytetrafluoroethylene,
wherein the fluorine-containing polymer has a structure represented by structural formula (7) or structural formula (8):

(7)

where n7 and m7 each independently represents an integer of 1 or more, (8)

where n8 and m8 each represents an integer of 1 or more,
wherein a content of the fluorine resin particles in the lubricant composition is 10 mass % to 50 mass %, and
wherein an amount of the fluorine-containing polymer dissolved in the perfluoropolyether with respect to the perfluropolyether is from 0.05 mass % to 10.00 mass %.

6. A fixing apparatus comprising:
a fixing belt having an endless shape;
a pressurizing member; and
a heater configured to heat the fixing belt with non-radiant heat,
the fixing apparatus being configured to heat a recording medium having an unfixed toner image in a nip formed by the fixing belt and the pressurizing member to fix the unfixed toner image to the recording medium,
wherein an inner peripheral surface of the fixing belt and at least a part of the heater are brought into contact with each other through a lubricant composition, and the lubricant composition comprises:

a perfluoropolyether as a base oil;
fluorine resin particles as a thickener; and
a fluorine-containing polymer having a tetrafluoroethylene structure under a state in which the fluorine-containing polymer is dissolved in the perfluoropolyether,
wherein the fluorine resin particles are particles of polytetrafluoroethylene,
wherein the fluorine-containing polymer has a structure represented by structural formula (7) or structural formula (8):

(7)

where n7 and m7 each independently represents an integer of 1 or more, (8)

where n8 and m8 each represents an integer of 1 or more,
wherein a content of the fluorine resin particles in the lubricant composition is 10 mass % to 50 mass %, and
wherein an amount of the fluorine-containing polymer dissolved in the perfluoropolyether with respect to the perfluropolyether is from 0.05 mass % to 10.00 mass %.

7. An image-forming apparatus comprising a sliding portion in which two members are brought into contact with each other through a lubricant composition, and at least one of the members is slidable with respect to another,
wherein the lubricant composition comprises:
a perfluoropolyether as a base oil;
fluorine resin particles as a thickener; and
a fluorine-containing polymer having a tetrafluoroethylene structure under a state in which the fluorine-containing polymer is dissolved in the perfluoropolyether,
wherein the fluorine resin particles are particles of polytetrafluoroethylene,
wherein the fluorine-containing polymer has a structure represented by structural formula (7) or structural formula (8):

(7)

where n7 and m7 each independently represents an integer of 1 or more, (8)

where n8 and m8 each represents an integer of 1 or more,
wherein a content of the fluorine resin particles in the lubricant composition is 10 mass % to 50 mass %, and
wherein an amount of the fluorine-containing polymer dissolved in the perfluoropolyether with respect to the perfluropolyether is from 0.05 mass % to 10.00 mass %.

* * * * *